(12) United States Patent
Yoon et al.

(10) Patent No.: US 9,669,603 B2
(45) Date of Patent: Jun. 6, 2017

(54) FILM FOR DISPLAY WINDOW, METHOD OF MANUFACTURING THE SAME, DISPLAY WINDOW HAVING THE SAME AND METHOD OF MANUFACTURING THE SAME

(71) Applicant: Samsung Electronics Co., Ltd., Suwon-si (KR)

(72) Inventors: Sung Woon Yoon, Suwon-si (KR); Soon Woo Kwon, Uiwang-si (KR); Jae-Sik Kim, Yongin-si (KR); Il Yong Seong, Hwaseong-si (KR); Kyo Ree Lee, Seoul (KR); Mi Ran Jeong, Suwon-si (KR); Ah Hyun Bae, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 50 days.

(21) Appl. No.: 14/591,334

(22) Filed: Jan. 7, 2015

(65) Prior Publication Data

US 2015/0190999 A1 Jul. 9, 2015

(30) Foreign Application Priority Data

Jan. 7, 2014 (KR) .................. 10-2014-0001928

(51) Int. Cl.
*B29C 65/52* (2006.01)
*B32B 37/12* (2006.01)
(Continued)

(52) U.S. Cl.
CPC .............. *B32B 7/12* (2013.01); *B32B 17/067* (2013.01); *D06N 3/0095* (2013.01); *D06Q 1/12* (2013.01); *B32B 37/02* (2013.01); *B32B 2037/1246* (2013.01); *B32B 2038/0076* (2013.01); *B32B 2038/0092* (2013.01); *B32B 2255/02* (2013.01); *B32B 2305/18* (2013.01); *B32B 2307/402* (2013.01); *B32B 2307/412* (2013.01); *B32B 2310/0831* (2013.01); *B32B 2311/00* (2013.01);
(Continued)

(58) Field of Classification Search
USPC ............. 156/152, 277; 427/162, 163.3, 553; 428/417
See application file for complete search history.

(56) References Cited

U.S. PATENT DOCUMENTS 4,054,697 A * 10/1977 Reed ....................... B44C 1/105
428/202
4,312,686 A * 1/1982 Smith ................... B29C 43/305
156/209

(Continued)

FOREIGN PATENT DOCUMENTS

| KR | 10-2000-0058404 | 10/2000 |
| KR | 10-2006-0038331 | 5/2006 |
| KR | 10-2011-0019157 | 2/2011 |

*Primary Examiner* — Sing P Chan
(74) *Attorney, Agent, or Firm* — Staas & Halsey LLP

(57) ABSTRACT

A film for a display window using a roll to roll method and a method of manufacturing the same includes forming a bonding layer or a release layer on a fabric film using a roll to roll method, and forming a decorative layer having a pattern or a color on the bonding layer or the release layer using the roll to roll method. When the film is manufactured by the roll to roll process, it is possible to improve productivity and reduce a unit price.

8 Claims, 14 Drawing Sheets

(51) Int. Cl.
    *B32B 37/26*     (2006.01)
    *B32B 38/10*     (2006.01)
    *B32B 38/14*     (2006.01)
    *B32B 43/00*     (2006.01)
    *B32B 7/12*     (2006.01)
    *D06N 3/00*     (2006.01)
    *B32B 17/06*     (2006.01)
    *D06Q 1/12*     (2006.01)
    *B32B 37/02*     (2006.01)
    *B32B 38/00*     (2006.01)

(52) U.S. Cl.
    CPC ....... *B32B 2451/00* (2013.01); *B32B 2457/20* (2013.01); *Y10T 428/1471* (2015.01); *Y10T 428/2481* (2015.01); *Y10T 428/249921* (2015.04); *Y10T 442/2098* (2015.04)

(56) References Cited

U.S. PATENT DOCUMENTS 5,591,527 A * 1/1997 Lu .......................... B42D 25/29
                                                            283/72
8,110,268 B2 * 2/2012 Hegemier ........... H04M 1/0283
                                                            428/40.1

* cited by examiner

FILM FOR DISPLAY WINDOW, METHOD OF MANUFACTURING THE SAME, DISPLAY WINDOW HAVING THE SAME AND METHOD OF MANUFACTURING THE SAME

CROSS-REFERENCE TO RELATED APPLICATIONS

This application claims the priority benefit of Korean Patent Application No. 10-2014-0001928, filed on Jan. 7, 2014 in the Korean Intellectual Property Office, the disclosure of which is incorporated herein by reference.

BACKGROUND

1. Field

The following description relates to a film and a method of manufacturing the same, and more specifically, to a film for a display window using a roll to roll method, and a method of manufacturing the same.

2. Description of the Related Art

In a display panel (hereinafter referred to as a panel) such as a liquid crystal display (LCD), a plasma display panel (PDP), or a light emitting diode (LED), a protection glass is provided in a front of a panel outputting an image to protect the panel and cover an edge thereof.

In the related art, a transparent protection plate made of a synthetic resin serves as such a front protection glass. However, due to its nature, the synthetic resin has problems in that transmittance is low and a surface may be scratched or discolored. Recently, tempered glass has been developed, and a front protection glass made of a tempered glass material having excellent transparency and a high strength is replacing the synthetic resin.

A light shielding unit configured to clearly distinguish or decorate a touch screen is formed in a rear surface of the front protection glass.

As a method of forming the light shielding unit, a method of directly printing a dark color on a protection glass using a silkscreen printing method and the like, and a method in which a bezel unit is printed on a film coated with an optically clear adhesive (OCA) or a pressure sensitive adhesive (PSA), and the film is laminated with the protection glass or is transferred have been under development.

In the silkscreen method, because the light shielding unit of a dark color is simply made, a design of an electronic product is very simple. In order to form a light shielding unit of several colors, the silkscreen printing should be repeated one time for each color. Accordingly, a tremendous cost and a great amount of time is required in order to represent various designs or patterns.

In the method in which a bezel unit is printed on a film coated with the OCA, and the film is laminated with the protection glass or is transferred, a design may be implemented by various methods such as ultraviolet (UV) ray patterning, deposition, printing, and etching. However, an optical film coated with a bonding layer is cut in units of sheets during manufacture and a process such as the UV ray patterning is performed in a corresponding state, which results in an economical problem in a production process.

SUMMARY

Additional aspects and/or advantages will be set forth in part in the description which follows and, in part, will be apparent from the description, or may be learned by practice of the disclosure.

In view of the above-described problems, in the present disclosure, a film is manufactured using a roll to roll process to improve productivity and reduce a unit price.

In addition, a film having a thinner thickness may be handled through a mechanical rewinding and winding process.

According to an aspect of the present disclosure, a method of manufacturing a film for a display window may include forming a bonding layer or a release layer on a fabric film using a roll to roll method, and forming a decorative layer having a pattern or a color on the bonding layer or the release layer using the roll to roll method.

The method may further include a vision recognition process in which a register mark is displayed in the bonding layer or the release layer, and the register mark is recognized by an image recognition device after forming the bonding layer or the release layer and before forming the decorative layer.

Forming the decorative layer may include at least one of forming a pattern layer for implementing a pattern, depositing a metal material for implementing a metallic effect, and forming a color layer for implementing a color.

Forming the decorative layer may sequentially include forming a pattern layer for implementing a pattern, forming a metal layer for implementing a metallic effect on the pattern layer, and forming a color layer for implementing a color on the metal layer.

Forming the pattern layer may include forming the pattern layer by radiating UV light.

Depositing the metal material may include transferring a fabric film from an unwinder roll to a drum, sputtering a metal material to the fabric film by a sputter, and transferring a completely deposited fabric film to a winder roll.

Providing the fabric film may include providing a fabric film including a base layer, an optically clear adhesive (OCA) binder layer or a pressure sensitive adhesive (PSA) binder layer formed on a surface of the base layer, and a protection film formed on a surface of the binder layer.

Forming the bonding layer on the fabric film may include forming the bonding layer on the other surface of the base layer.

The method may further include punching the fabric film after forming the decorative layer.

Forming the release layer may include forming a release layer in which a surface of the release layer is coated with ink to form a decorative layer and a fabric film combined with the other surface of the release layer is released.

The method may further include forming the OCA binder layer or the PSA binder layer on the decorative layer using the roll to roll method.

The method may further include forming a protection film on the OCA binder layer or the PSA binder layer using the roll to roll method.

The method may further include punching the fabric film after coating the protection film.

According to an aspect of the present disclosure, a method of manufacturing a display window may include manufacturing a film, and removing a protection film of the film and combining the film with a protection glass, wherein manufacturing the film includes: forming a bonding layer or a release layer on a fabric film using a roll to roll method and forming a decorative layer for implementing a pattern or a color on the bonding layer or the release layer using the roll to roll method.

Manufacturing the film may further include forming an OCA binder layer or a PSA binder layer on the decorative layer using the roll to roll method, and forming the protection film on the binder layer.

According to an aspect of the present disclosure, a film for a display window may include a fabric film, a bonding layer or a release layer formed on the fabric film using a roll to roll method, and a decorative layer having a color or a pattern formed on the bonding layer or the release layer using the roll to roll method.

The fabric film may further include a base layer, an OCA binder layer, or a PSA binder layer formed on a surface of the base layer, and a protection film formed on a surface of the binder layer The bonding layer may be formed on the other surface of the base layer.

The decorative layer may include at least one of a pattern layer for implementing a pattern, a metal layer for implementing a metallic effect, and a color layer for implementing a color.

The film may further include an OCA binder layer or a PSA binder layer formed on the decorative layer using the roll to roll method.

The film may further include a protection film formed on the OCA binder layer or the PSA binder layer using the roll to roll method.

According to an aspect of the present disclosure, a display window may include a protection glass, and a film combined with the protection glass, wherein the film includes a fabric film combined with the protection glass, a bonding layer or a release layer formed on the fabric film using a roll to roll method, and a decorative layer having a color or a pattern formed on the bonding layer or the release layer using the roll to roll method.

The fabric film may include a base layer, an OCA binder layer or a PSA binder layer formed on a surface of the base layer, and a protection film formed on a surface of the binder layer.

The film may further include an OCA binder layer or a PSA binder layer formed on the decorative layer using the roll to roll method.

The film may further include a protection film formed on the OCA binder layer or the PSA binder layer using the roll to roll method.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
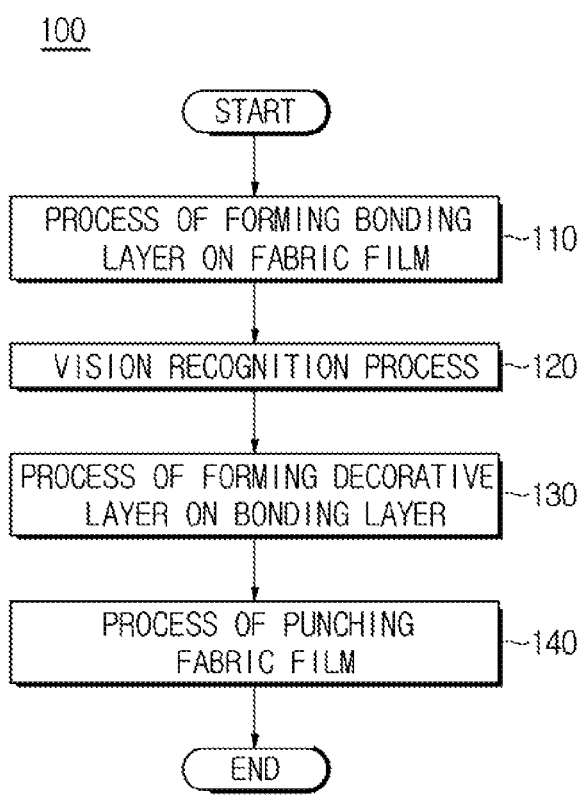
FIG. 1 is a flowchart illustrating manufacturing a laminating film of a film for a display window according to an embodiment.

Reference will now be made in detail to the embodiments, examples of which are illustrated in the accompanying drawings, wherein like reference numerals refer to like elements throughout. The embodiments are described below to explain the present disclosure by referring to the figures.

Embodiments described in this specification and configurations illustrated in the drawings are only examples. Various modifications that can replace the embodiments of this specification and the drawings may be provided at the time of filing of this application.

Hereinafter, embodiments of the present disclosure will be described in detail with reference to the accompanying drawings.

FIG. 1 is a process flowchart illustrating a method of manufacturing a film for a display window according to an embodiment. A laminating film of a film for a display window according to an embodiment of the present disclosure will be described in detail with reference to FIG. 1.

As illustrated in FIG. 1, a method 100 of manufacturing a laminating film according to an embodiment includes forming a bonding layer on a fabric film using a roll to roll method (operation 110), and forming a decorative layer on the bonding layer using the roll to roll method (operation 130).

In addition, a method of manufacturing a laminating film according to an example of the embodiment may further include a vision recognition process before forming the decorative layer is performed (operation 120). A method of manufacturing a laminating film according to an example may further include punching a fabric film after forming the decorative layer (operation 140).

As the fabric film, a rewinding film in a roll form is provided. The fabric film includes a base layer, a binder layer formed on a surface of the base layer, and a protection film formed on a surface of the binder layer.

The binder layer is formed on a surface of the base layer, and the bonding layer (to be described below) is formed on the other surface thereof. In other words, the base layer serves as a substrate layer. In addition, the base layer may be made of a material such as polyethylene terephthalate (PET), for example.

The binder layer may include an optically clear adhesive (OCA) binder layer or a pressure sensitive adhesive (PSA) binder layer. The OCA is an optically transparent double-sided tape of an optically transparent inorganic material type. The PSA is a pressure sensitive adhesive. In this specification, the PSA refers to a viscoelastic material that immediately adheres to most substrates when a pressure is applied and permanently maintains adhesiveness. The PSA may be combined at random under ambient conditions. Thus, a film may be attached to a surface of a protection glass of a display panel by the binder layer according to the embodiment.

The protection film is provided to protect the OCA or PSA material of the binder layer from external contamination.

When the fabric film is provided, forming the bonding layer on the fabric film is performed, and forming the bonding layer is performed by the roll to roll method.

The base layer of the fabric film is not easily directly coated with ink. Therefore, when the bonding layer is formed on a surface of the base layer, the base layer and the decorative layer are easily combined, and are easily coated with the ink at the same time.

More specifically, forming the bonding layer includes formulating raw materials, coating the fabric film with a raw material, and drying a coating solution. When the fabric film is transferred through a roll, a surface of the base layer of the fabric film is uniformly coated with the formulated raw material, and the fabric film is introduced into a dryer and dried.

When the bonding layer is formed, forming the decorative layer having a pattern or a color is performed. Forming the decorative layer is performed by the roll to roll method.

Forming the decorative layer may include at least one of forming a pattern layer for implementing a pattern, depositing a metal material for implementing a metallic effect, and forming a color layer for implementing a color. As forming the decorative layer according to the embodiment, forming the decorative layer that sequentially includes forming a pattern layer for implementing a pattern, forming a metal layer for implementing a metallic effect on the pattern layer, and forming a color layer for implementing a color on the metal layer will be exemplified.

Forming the pattern layer may include forming the pattern layer by radiating UV light. forming the pattern layer by radiating UV light may include formulating raw materials, patterning a pattern mold by supplying the formulated raw material and radiating UV light, and curing a patterned coating solution.

Figure 2:
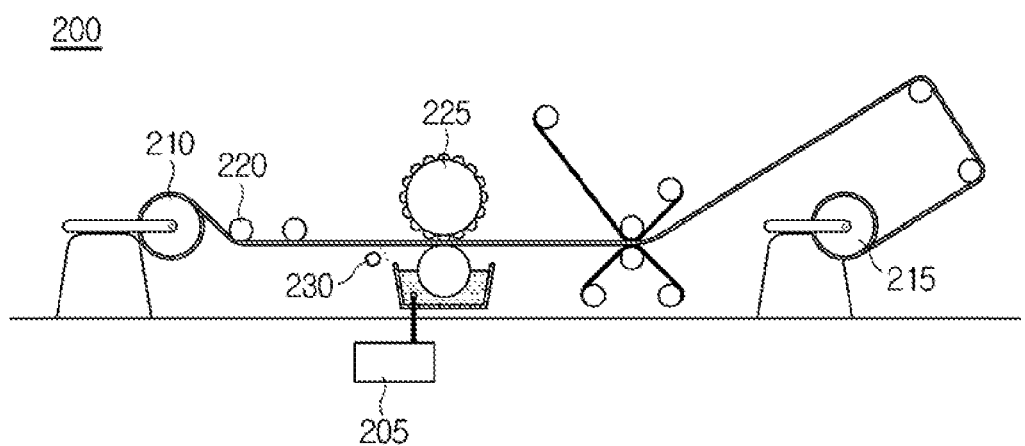
FIG. 2 is a diagram illustrating forming a pattern layer by radiating UV light in FIG. 1.

FIG. 2 is a diagram illustrating forming the pattern layer by radiating UV light. As illustrated in FIG. 2, a roll to roll device 200 that forms the UV pattern layer of the present disclosure includes a raw material blending device 205, an unwinder roll 210, a winder roll 215, a plurality of guide rolls 220, a pattern roll 225, and a UV light radiating device 230.

The unwinder roll 210 and the winder roll 215 wind up or release the fabric film by mutual, or coordinated, rotational motion. The plurality of guide rolls 220 are arranged at predetermined intervals and control tension when the fabric film rolls. The fabric film is continuously transferred to each corresponding work area including the pattern roll 225 by a mutual mechanical operation of the unwinder roll 210, the winder roll 215, and the plurality of guide rolls 220.

Forming the pattern layer using the roll to roll device configured in such a way will be described. First, the fabric film is released by the unwinder roll 210 and is transferred to the pattern roll 225 by the plurality of guide rolls 220. When the fabric film is transferred, the formulated raw material is supplied to the fabric film, the raw material is patterned by the pattern roll 225 and is simultaneously cured by UV light radiated by the UV light radiating device 230, and the pattern layer is formed on a surface of the fabric film. In addition, in addition to the curing by UV light radiated onto the pattern roll 225, an additional UV curing process for curing the coating solution may be performed.

After forming the pattern layer is performed, forming the metal layer for implementing a metallic effect is performed. Forming the metal layer according to the embodiment may include depositing the metal material for implementing a metallic effect.

More specifically, depositing the metal material may include transferring the fabric film from the unwinder roll to a drum, sputtering the metal material to the fabric film by a sputterer, and transferring the completely deposited fabric film to the winder roll.

Figure 3:
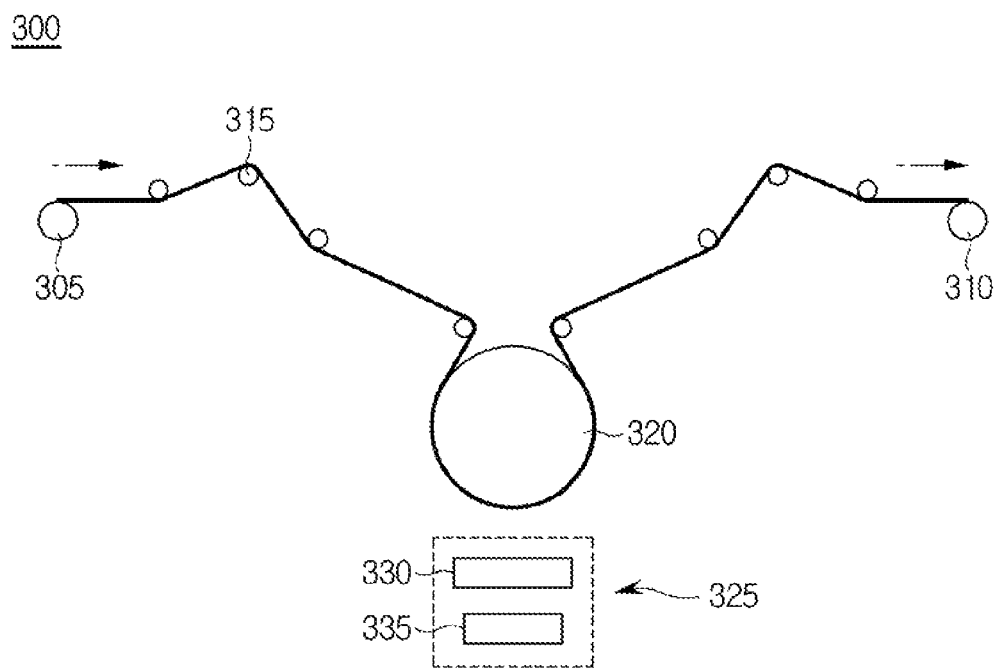
FIG. 3 is a diagram illustrating depositing a metal material using a roll to roll method in FIG. 1.

FIG. 3 is a diagram illustrating implementing sputtering using the roll to roll method. As illustrated in FIG. 3, a roll to roll sputtering device 300 configured to implement sputtering of the present disclosure includes an unwinder roll 305, a winder roll 310, a plurality of guide rolls 315, a drum 320, and a sputterer 325. Redundant description of the unwinder roll 305, the winder roll 310, and the plurality of guide rolls 315 will be omitted.

Depositing the metal material using the roll to roll device configured in such a way will be described. First, when the patterned fabric film wrapped around the roll is released and is transferred to the drum 320 by the plurality of guide rolls 315, the sputterer 325 installed in the vicinity of the drum 320 performs a sputtering process according to a transfer order of the fabric film.

The sputterer 325 is installed in a single chamber and quickly sputters deposition material. The sputterer 325 is disposed in a side of the drum 320, and may include a cathode 335 configured to adjust a deposition thickness according to a magnitude of a current when the metal material used as a target material 330 and a direct current (DC) are supplied.

After forming the metal layer, the color layer is formed. Forming the color layer may include forming at least one color layer. In other words, at least one color layer may be formed by formulating various raw coating materials according to a color to be implemented.

Figure 4:
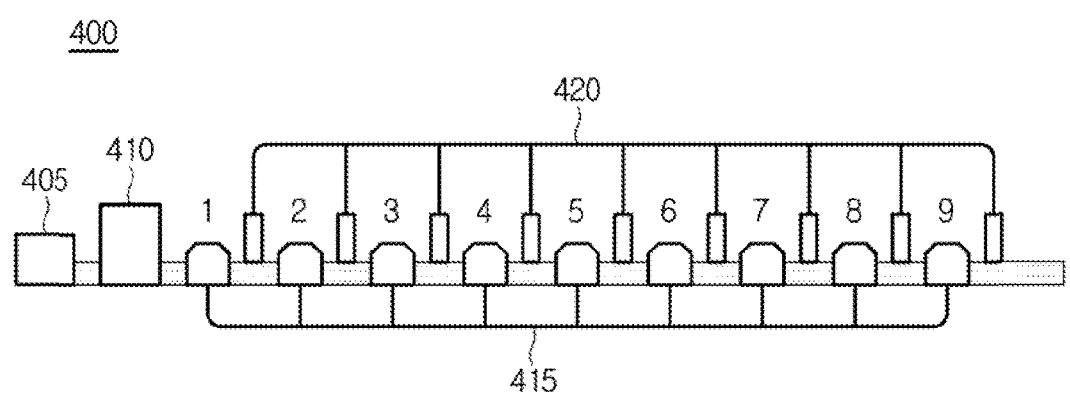
FIG. 4 is a diagram illustrating forming a color layer using the roll to roll method in FIG. 1.

FIG. 4 is a diagram illustrating forming the color layer using the roll to roll method. As illustrated in FIG. 4, the roll to roll device 400 configured to form the color layer of the present disclosure may include an ink formulating device 405, a heat treatment device 410, a printing unit 415, and a dryer 420.

Forming the color layer using the roll to roll device configured in such a way will be described. First, ink of a color to be printed is formulated by the ink formulating device 405. According to a color of the color layer to be printed, at least one type of ink may be formulated to implement at least one color.

When the ink is formulated, the fabric film is released by the unwinder roll and is transferred to the heat treatment device 410 by the plurality of guide rolls. Heat treatment is performed to prevent deformation of the fabric film before forming the color layer.

The fabric film that has been heat-treated is transferred to the printing unit 415 by the guide roll. The printing unit 415 supplies the ink formulated by the ink formulating device 405 to form the color layer on the metal layer. When the ink is supplied from the printing unit 415 to the fabric film, the fabric film is provided to the dryer 420. While a case in which a printing process is performed nine times is exemplified in FIG. 4, the printing process is not limited thereto, and may be performed any number of times.

Next, a method of manufacturing a laminating film that further includes a vision recognition process according to an example embodiment will be described.

The method of manufacturing a laminating film according to an example embodiment may further include the vision recognition process in which a register mark is displayed in the bonding layer and the register mark is recognized by an image recognition device after forming the bonding layer and before forming the decorative layer.

In general, because the roll to roll method is a rough process, when a film for a display window is manufactured using the roll to roll method, it is difficult to satisfy a tight tolerance range of the display window. Thus, when the decorative layer is formed at an appropriate position using the vision recognition process, it is possible to cope with a decreased reliability problem occurring when the film for a display window is manufactured using the roll to roll method and increase accuracy in film manufacturing.

Next, a method of manufacturing a laminating film that further includes a punching process according to an example of the embodiment will be described.

In the method of manufacturing a laminating film according to an example of the embodiment, punching the fabric film may be performed after forming the color layer is performed. The punching process may include cutting the film in which the decorative layer is completely formed, and more specifically, may include loading a film in a punch device, punching the loaded film by a punching unit, and detaching the film. In addition, the punching process may include a punching method using a laser in addition to a mechanical method.

Figure 5:
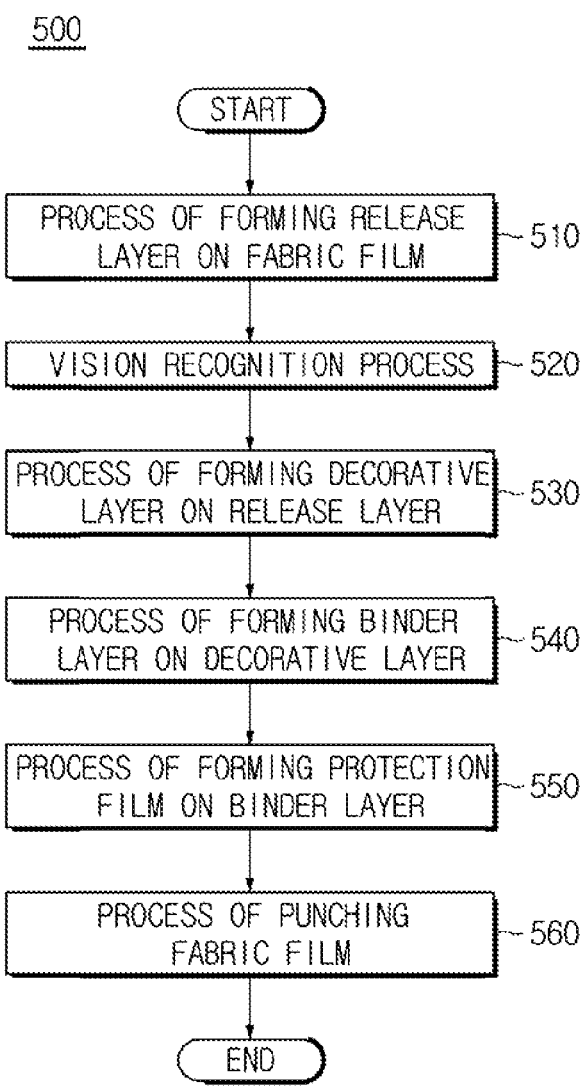
FIG. 5 is a flowchart illustrating manufacturing a laminating film of a film for a display window according to an embodiment.

Next, a method of manufacturing a film for a display window according to an embodiment of the present disclosure will be described in detail. FIG. 5 is a process flowchart illustrating manufacturing a film for a display window according to an embodiment. A film for transfer of the film for a display window according to an embodiment of the present disclosure will be described in detail with reference to FIG. 5.

As illustrated in FIG. 5, the method 500 of manufacturing the film for transfer according to an embodiment includes forming a release layer on a fabric film using a roll to roll method (operation 510), forming a decorative layer on the release layer using the roll to roll method (operation 530), forming a binder layer on the decorative layer using the roll to roll method (operation 540), and forming a protection film on the binder layer using the roll to roll method (operation 550).

In addition, a method of manufacturing a film for transfer according to an example of the embodiment may further include a vision recognition process before forming the decorative layer is performed (operation 520). A method of manufacturing a film for transfer according to an embodiment may further include punching the film after forming the protection film on the binder layer is performed (operation 560). Hereinafter, for convenience of description, redundant description of the laminating film in FIG. 1 will be omitted.

As the fabric film, a rewinding film in a roll form is provided. Because the fabric film provided when the film for transfer is manufactured will be released after a transfer process (to be described below) is performed, it may be made of a material such as PET so as to be easily released.

When the fabric film is provided, forming the release layer on the fabric film is performed, and forming the release layer may be performed using the roll to roll method.

The fabric film is not easily directly coated with ink. Therefore, when the release layer is formed on a surface of the fabric film, it may be easily coated with the ink. In addition, in order to easily release the release film from the fabric film, a melamine-based release agent or a silicone-based release agent may be included. That is, forming the release layer may include forming a release layer in which the decorative layer is easily formed on a surface of the release layer and the fabric film combined with the other surface of the release layer is easily released.

More specifically, formulating raw materials, coating the fabric film with the raw material, and drying a coating solution may be included. When the fabric film is transferred through the roll, a surface of the fabric film is uniformly coated with the formulated raw material, and the coated fabric film is introduced into a dryer and is dried.

When the release layer is formed, forming a decorative layer having a pattern or a color is performed, and forming the decorative layer may be performed by the roll to roll method. In addition, forming the decorative layer may include at least one of forming a pattern layer for implementing a pattern, depositing a metal material for implementing a metallic effect, and forming a color layer for implementing a color. Hereinafter, redundant description of the above-described method of manufacturing the laminating film will be omitted.

When the decorative layer is formed, forming the binder layer is formed, and forming the binder layer may be performed by the roll to roll method. Forming the binder layer includes forming an OCA binder layer or a PSA binder layer.

Figure 6:
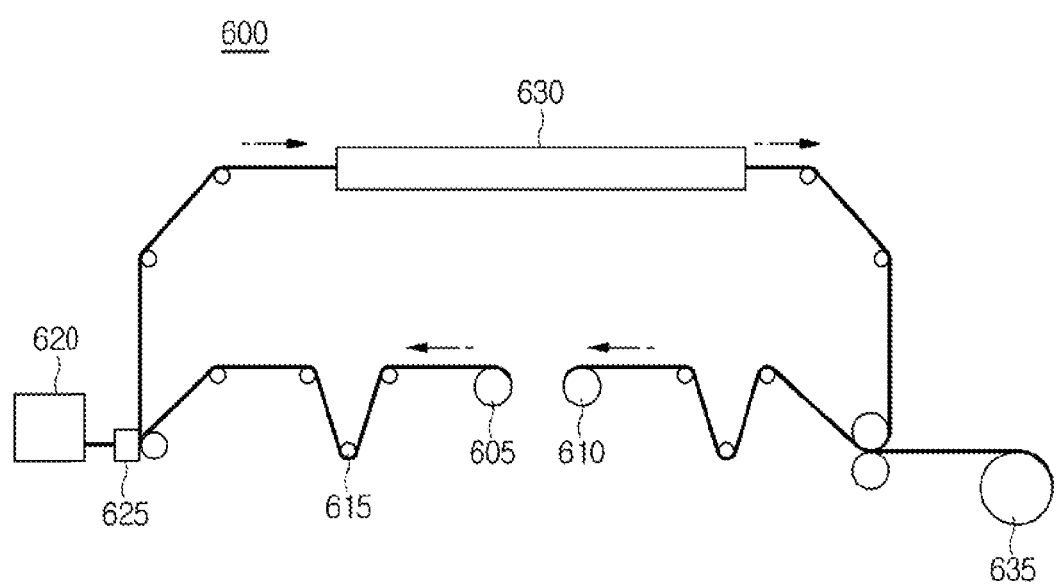
FIG. 6 is a diagram illustrating forming a binder layer in FIG. 5.

FIG. 6 is a diagram illustrating forming the binder layer. As illustrated in FIG. 6, the roll to roll device 600 configured to form the binder layer of the present disclosure may include an unwinder roll 605, a winder roll 610, a plurality of guide rolls 615, a raw material formulating device 620, a raw material supplying device 625, and a dryer 630. In addition, forming the binder layer may include formulating raw materials, supplying and coating the raw materials, and drying a coating solution.

More specifically, when the fabric film is released by the unwinder roll 605, the fabric film is transferred in a direction of the raw material supplying device by the plurality of guide rolls 615. When the fabric film is transferred in the direction of the raw material supplying device, the raw materials formulated by the raw material formulating device 620 are supplied to the fabric film and the fabric film is coated. When the fabric film is coated with the raw materials, the coated fabric film is transferred to the dryer 630 along the plurality of guide rolls 615 and is dried.

When the binder layer is formed, forming the protection film is performed. As illustrated in FIG. 6, in forming the protection film according to the embodiment, the fabric film, which is dried by the dryer 630 and transferred, is supplied with a protection film released by a protection film unwinder roll 635 to form the protection film.

Next, a method of manufacturing a film for transfer according to an example of an embodiment may further include a vision recognition process in which a register mark is displayed in the release layer and the register mark is recognized by an image recognition device after forming the release layer and before forming the decorative layer. Also, in a method of manufacturing a film for transfer according to an example of an embodiment, punching the film for transfer may be performed after forming the protection film. Hereinafter, for convenience of description, redundant description of the laminating film related to the vision recognition process and the punching process will be omitted.

Figure 7:
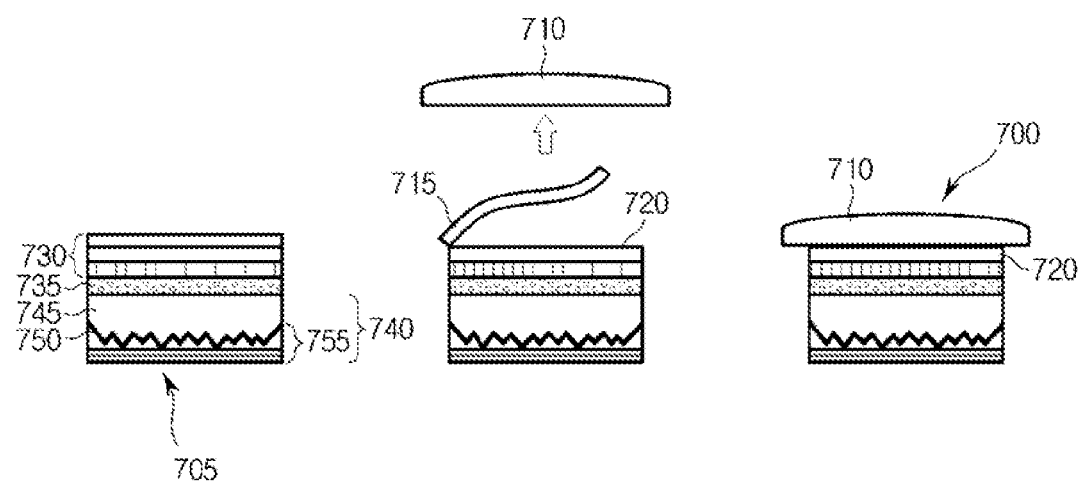
FIG. 7 is a diagram illustrating manufacturing a display window including the manufacturing process in FIG. 1.

Next, a method of manufacturing a display window including the method of manufacturing the laminating film according to the embodiment illustrated in FIG. 1 will be described. FIG. 7 is a diagram illustrating manufacturing a display window according to the embodiment.

As illustrated in FIG. 7, a method of manufacturing a display window 700 according to an embodiment includes manufacturing a film for a display window 705, removing a protection film 715 of the film, and combining the film 705 with a protection glass 710.

In manufacturing the film 705, the method of manufacturing the laminating film 705 illustrated in FIG. 1 may be applied. When the film is manufactured by the process illustrated in FIG. 1, manufacturing the display window 700 by combining the film 705 with the protection glass 710 is performed. The method of manufacturing the display window 700 according to the embodiment includes combining the laminating film 705 with the protection glass 710, and more specifically, includes laminating the laminating film 705 to the protection glass 710.

The laminate process will be described more specifically. To laminate the film 705, the protection film 715 of the laminating film 705 manufactured by the method of FIG. 1 is removed. When the protection film 715 is removed, a PSA or OCA binder layer 720 is exposed. When the binder layer 720 is exposed, a surface of the binder layer 720 is attached to a surface of the protection glass 710 such that the binder layer 720 and a surface of the protection glass 710 are combined. By performing the laminating process in this way, it is possible to manufacture the display window 700.

Figure 8:
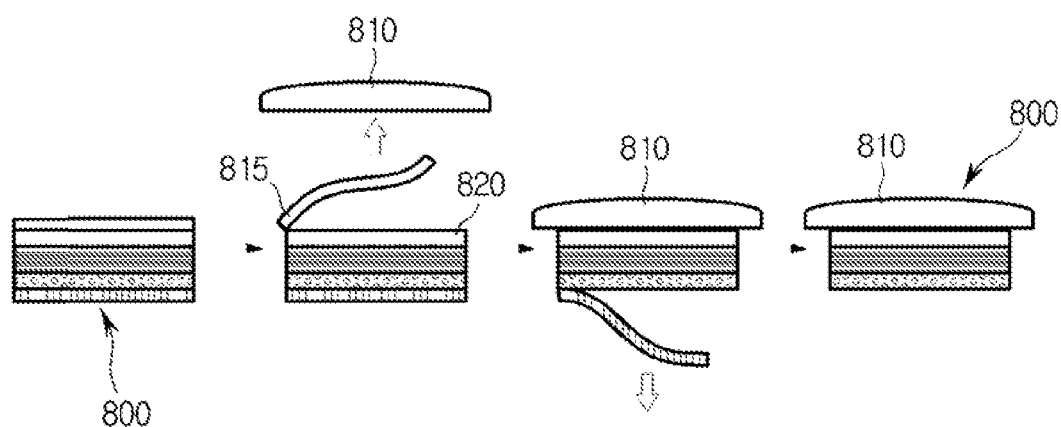
FIG. 8 is a diagram illustrating manufacturing a display window including the manufacturing process in FIG. 5.

Next, a method of manufacturing a display window 800 including a method of manufacturing a film for transfer 805 according to an embodiment illustrated in FIG. 5 will be described. FIG. 8 is a diagram illustrating manufacturing the display window 800 according to an embodiment.

As illustrated in FIG. 8, the method of manufacturing the display window 800 according to an embodiment includes manufacturing the film for a display window 805 and removing a protection film 815 of the film 805 and combining the film 805 with a protection glass 810.

In manufacturing the film 805, the method of manufacturing a film for transfer 805 illustrated in FIG. 5 may be applied. Hereinafter, a case including the method of manufacturing the film for transfer 805 illustrated in FIG. 5 will be exemplified.

When the film 805 is manufactured, manufacturing the display window 800 by combining the film 805 with the protection glass 810 is performed. The method of manufacturing the display window 800 according to an embodiment includes combining the film for transfer 805 with the protection glass 810, and more specifically, includes transferring the film for transfer 805 to the protection glass 810.

Figure 9:
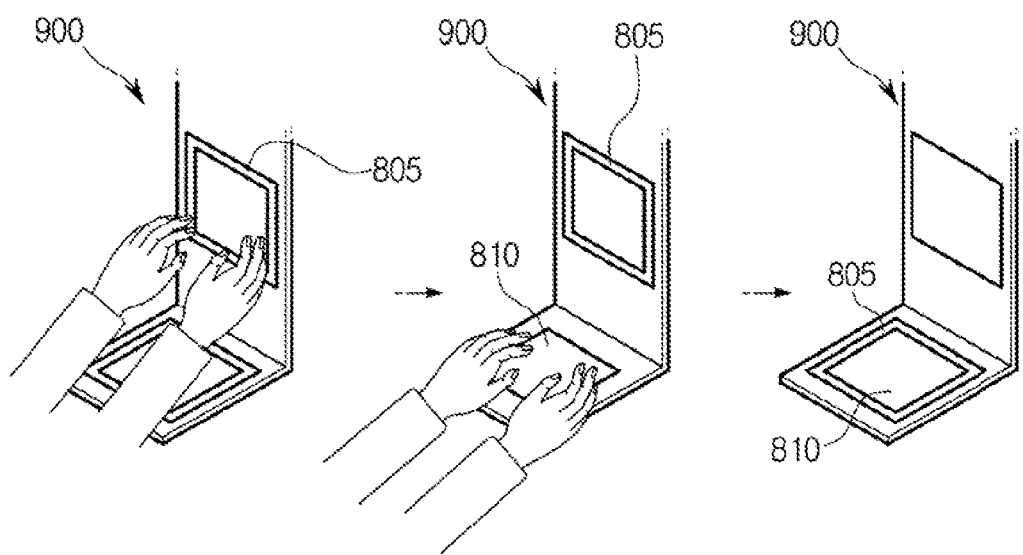
FIG. 9 is a diagram illustrating a transfer process.

FIG. 9 is a diagram illustrating the transfer process. The transfer process will be described in detail with reference to FIG. 9.

First, in order to transfer the film 805, the film for transfer 805 manufactured by the method of FIG. 5 is loaded in a transfer device 900, and the protection film 815 is removed. Next, the protection glass 810 is loaded in the vicinity of a loading portion in which the film is loaded. In the film 805 from which the protection film 815 is removed, a PSA or OCA binder layer 820 is exposed at a surface thereof. Thus, a surface of the binder layer 820 is attached to a surface of the protection glass 810 such that the exposed binder layer 820 and a surface of the protection glass 810 are combined. When a surface of the binder layer 820 is attached to the protection glass 810, a color or a pattern of the decorative layer is transferred to the protection glass 810 to manufacture the display window 800. In addition, after the transfer process is performed, the fabric film is released, and then manufacture of the display window 800 according to an embodiment may be completed.

Figure 10:
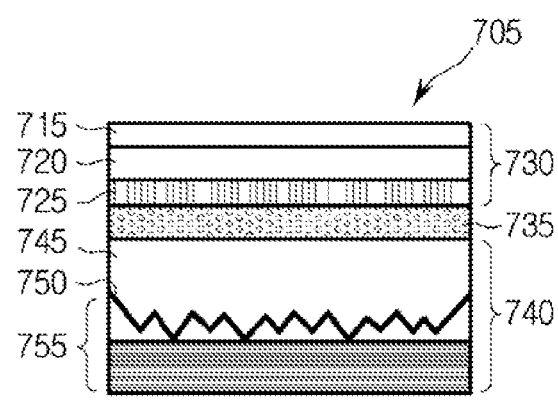
FIG. 10 is a diagram illustrating a structure of a laminating film of a film for a display window according to an embodiment.

Next, the film for a display window 705 according to the embodiment of the present disclosure will be described in detail. FIG. 10 is a diagram illustrating a structure of the laminating film 705 of the film for a display window 705 according to the embodiment.

As illustrated in FIG. 10, the laminating film 705 according to the embodiment includes a fabric film 730, a bonding layer 735 formed on the fabric film 730 by the roll to roll method, and a decorative layer 740 having a color or a pattern formed on the bonding layer 735 by the roll to roll method.

The fabric film 730 may include a base layer 725, the binder layer 720 formed on a surface of the base layer 725, and the protection film 715 formed on a surface of the binder layer 720. The base layer 725 may be made of a material such as PET. The binder layer 720 may include an OCA binder layer or a PSA binder layer, and serves as an adhesive that combines the film 705 with the protection glass 710 of the display window 700. The protection film 715 is provided to protect the binder layer 720 serving as the adhesive, and is removed during combining the film 705 with the protection glass 710.

The bonding layer 735 is combined with the fabric film 730, and more specifically, is combined with the base layer 725 of the fabric film 730. That is, in the laminating film 705 according to the embodiment, the bonding layer 735 and the decorative layer 740 are formed on opposite surfaces of the base layer 725 on which the binder layer 720 is formed. The bonding layer 735 serves as the adhesive to prevent the fabric film 730 and the decorative layer 740 from being separated. Also, because the base layer 725 of the fabric film 730 is not easily directly coated with ink, the adhesive provides a condition in which the fabric film is easily coated with the ink.

The decorative layer 740 may include at least one of a pattern layer 745 for forming a pattern, a metal layer 750 for implementing a metallic effect, and a color layer 755 for implementing a color. The color layer 755 may include at least one layer according to a color to be implemented. FIG. 10 exemplifies a structure in which the pattern layer 745 is formed on the bonding layer 735, the metal layer 750 is formed on the pattern layer 745, and the color layer 755 is formed on the metal layer 750, but the structure of the decorative layer 740 is not limited thereto. The structure may be understood as a concept including modifications falling within the scope that can be easily implemented by those skilled in the art.

Figure 11:
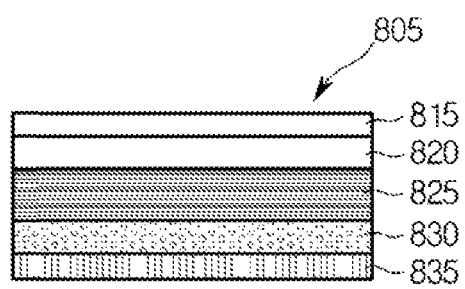
FIG. 11 is a diagram illustrating a structure of a film for transfer of a film for a display window according to an embodiment.

Next, the film for a display window 805 according to an embodiment of the present disclosure will be described in detail. FIG. 11 is a diagram illustrating a structure of the film for transfer 805 of the film for a display window 805 according to an embodiment.

As illustrated in FIG. 11, the film for transfer 805 according to an embodiment includes a fabric film 835, a release layer 830 formed on the fabric film 835 by the roll to roll method, a decorative layer 825 having a color or a pattern formed on the release layer 830 by the roll to roll method, the binder layer 820 formed on the decorative layer 825 by the roll to roll method, and the protection film 815 formed on the binder layer 820 by the roll to roll method.

Unlike the fabric film 730 of the laminating film 705, the fabric film 835 includes a single layer, and is released after a color or a pattern of the film for transfer 805 is transferred to the protection glass 810. Thus, the fabric film 835 may include PET.

The release layer 830 is combined with the fabric film 835. The release layer 830 may include a melamine-based release agent or a silicone-based release agent such that the fabric film 835 is easily released when the display window 800 is manufactured. Also, because the fabric film 835 is not easily directly coated with the ink, the release layer 830 is formed on the fabric film 835 to provide a condition in which the fabric film is easily coated with the ink.

The decorative layer 825 may include at least one of a pattern layer for implementing a pattern, a metal layer for implementing a metallic effect, and a color layer for implementing a color. The color layer may include at least one layer according to a color to be implemented. FIG. 11 illustrates a structure in which a plurality of color layers are formed on the release layer 830, but the structure of the decorative layer 825 is not limited thereto.

The binder layer 820 is a layer having adhesive strength which enables the decorative layer 825 of the film for transfer 805 to be transferred to the protection glass 810 for the display window 800. The binder layer 820 may include an OCA binder layer or a PSA binder layer.

The protection film 815 is provided to protect adhesive performance of the binder layer 820 from an external contamination material. The protection film 815 is removed when the decorative layer 825 of the film for transfer 805 is transferred to the protection glass 810.

Figure 12:
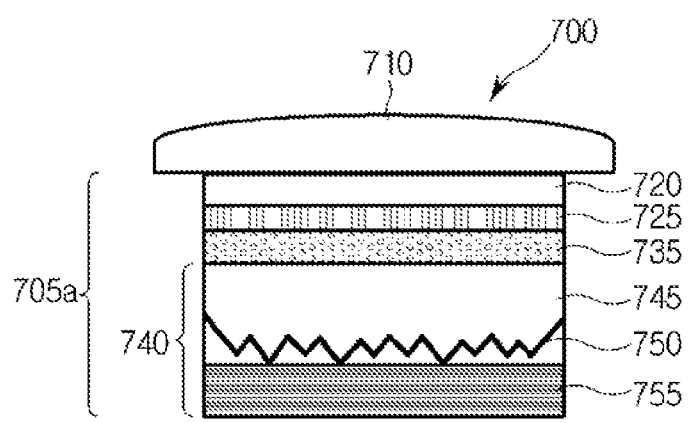
FIG. 12 is a diagram illustrating a structure of a display window according to an embodiment.

Next, the display window 700 according to the embodiment of the present disclosure will be described in detail. FIG. 12 is a diagram illustrating a structure of the display window 700 according to the embodiment.

As illustrated in FIG. 12, the display window 700 according to the embodiment includes the protection glass 710 and the film 705 combined with the protection glass 710.

The film 705 combined with the protection glass 710 of the display window 700 according to the embodiment may include the laminating film 705. More specifically, the laminating film 705 may include the fabric film 730 combined with the protection glass 710, the bonding layer 735 formed on the fabric film 730 by the roll to roll method, and the decorative layer 740 having a color or a pattern formed on the bonding layer 735 by the roll to roll method.

The bonding layer 735 and the decorative layer 740 are the same as those in the structure of the film 705 illustrated in FIG. 10. However, the fabric film 730 of the embodiment includes the binder layer 720 and the base layer 725 but the protection film 715 is removed from the structure of FIG. 10. That is, during laminating the laminating film 705 to the protection glass 710, the protection film 715 is removed. Therefore, a film 705a combined with the display window 700 according to the embodiment may include the film 705a from which the protection film 715 is removed.

Figure 13:
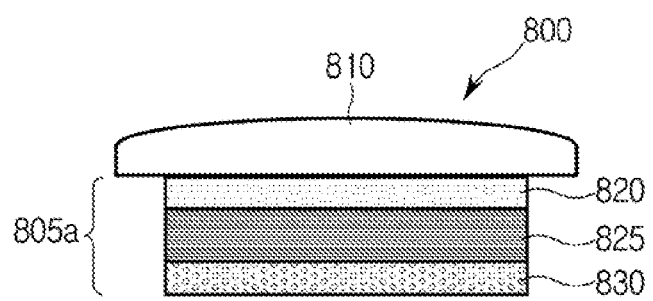
FIG. 13 is a diagram illustrating a structure of a display window according to an embodiment.

Next, the display window 800 according to an embodiment of the present disclosure will be described in detail. FIG. 13 is a diagram illustrating a structure of the display window 800 according to an embodiment.

As illustrated in FIG. 13, the display window 800 according to an embodiment includes the protection glass 810 and the film 805a combined with the protection glass 810.

The film 805a combined with the protection glass 810 of the display window 800 according to an embodiment may include the film for transfer 805a. More specifically, the film for transfer 805a may include the fabric film 835 combined with the protection glass 810, the release layer 830 formed on the fabric film 835 by the roll to roll method, the decorative layer 825 having a color or a pattern formed on the release layer 830 by the roll to roll method, and the binder layer 820 formed on the decorative layer 825 by the roll to roll method. In addition, during transferring the film for transfer 805a to the protection glass 810, the protection film 815 is removed. Therefore, a film 805a combined with the display window 800 according to the embodiment may include the film 805a from which the protection film 815 is removed.

Figure 14:
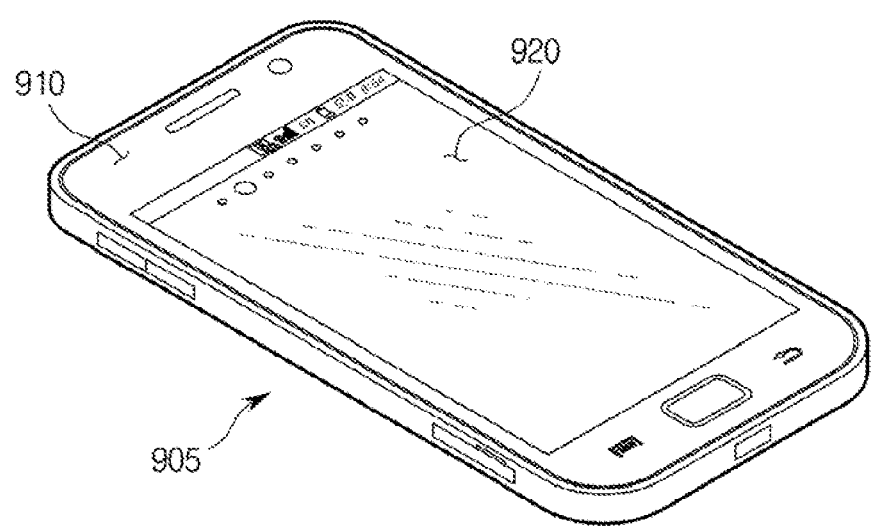
FIG. 14 is a diagram illustrating an example in which the display window of FIG. 13 is applied to a smart phone.

Next, an application example of the display window 800 with which the film 805 according to the present disclosure is combined will be described in detail with reference to FIG. 14. FIG. 14 is a diagram illustrating an example in which the display window 800 of FIG. 13 is applied to a smartphone 905. However, smartphone 905 is merely an example of an application of the film 805 combined with the protection glass 810 of the display window 800. The disclosure is not limited thereto, such that the disclosure may also be used in various applications other than a smartphone.

As illustrated in FIG. 14, the film 805 according to the present disclosure is combined with the protection glass 810 for a display window to form a light shielding unit 910. The light shielding unit 910 enables a rear surface of the protection glass 810 to be invisible and clearly separates a touch screen 920 at the same time. The light shielding unit 910 may be designed to have a pattern as illustrated in FIG. 14, and may be designed to have a single color without the pattern.

The films 705 and 805 forming the light shielding unit 910 of the display windows 700 and 800, the method of manufacturing the same, the display windows 700 and 800 including the films 705 and 805, and the method of manufacturing the same have been described. The present disclosure is not limited to the above-described embodiments, but may be understood as a broad concept including disclosures falling within the scope that can be easily construed by those skilled in the art.

The method of manufacturing the film that is configured as described above according to the present disclosure may have the following advantages.

First, because the film is manufactured using a roll to roll process, it is possible to improve productivity and reduce a unit price.

In addition, in general, a film having a constant thickness is manufactured to easily fix and carry the film when the film is manufactured in units of sheets. However, when the roll to roll process is used, it is possible to handle a carrier film having a thinner thickness through a mechanical rewinding and winding process. Therefore, it is possible to achieve an economical process.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A method of manufacturing a film for a display window, comprising:
    forming at least one of a bonding layer and a release layer on a releasable fabric film using a roll to roll method; and
    forming a decorative layer having at least one of a pattern and a color on the at least one of the bonding layer and the release layer using the roll to roll method.

2. The method according to claim 1, further comprising:
    a vision recognition process in which a register mark is displayed in the at least one of the bonding layer and the release layer, and the register mark is recognizable by an image recognition device.

3. The method according to claim 1,
    wherein forming the decorative layer comprises at least one of:
    forming a pattern layer for implementing a pattern by radiating ultraviolet (UV) light,
    depositing a metal material for implementing a metallic effect, and
    forming a color layer for implementing a color.

4. The method according to claim 1, further comprising:
    providing a fabric film,
    wherein the fabric film comprises a base layer, at least one of an optically clear adhesive (OCA) binder layer and a pressure sensitive adhesive (PSA) binder layer formed on a surface of the base layer, and a protection film formed on a surface of the binder layer, and
    wherein forming the bonding layer on the fabric film comprises forming the bonding layer on the other surface of the base layer.

5. The method according to claim 1, wherein the forming the release layer comprises forming a release layer in which a surface of the release layer is coated with ink to form a decorative layer and a fabric film combined with the other surface of the release layer is released.

6. The method according to claim 1, further comprising:
    forming at least one of an optically clear adhesive (OCA) binder layer and a pressure sensitive adhesive (PSA) binder layer on the decorative layer using the roll to roll method; and
    forming a protection film on the at least one of the OCA binder layer and the PSA binder layer using the roll to roll method.

7. A method of manufacturing a display window, comprising:
    manufacturing a film; and
    removing a protection film of the film and combining the film with a protection glass,
    wherein the manufacturing the film comprises:
    forming at least one of a bonding layer and a release layer on a releasable fabric film using a roll to roll method; and
    forming a decorative layer for implementing at least one of a pattern and a color on the at least one of the bonding layer and the release layer using the roll to roll method.

8. The method according to claim 7,
    wherein the manufacturing the film further comprises:
    forming at least one of an optically clear adhesive (OCA) binder layer and a pressure sensitive adhesive (PSA) binder layer on the decorative layer using the roll to roll method; and
    forming the protection film on the binder layer.

* * * * *